(12) United States Patent
Drevö

(10) Patent No.: US 9,277,434 B2
(45) Date of Patent: Mar. 1, 2016

(54) IDENTIFICATION OF UE COUNTING RESULTS IN EMBMS

(75) Inventor: Markus Drevö, Linköping (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 105 days.

(21) Appl. No.: 14/235,157

(22) PCT Filed: Jul. 6, 2012

(86) PCT No.: PCT/SE2012/050803
§ 371 (c)(1),
(2), (4) Date: Jan. 27, 2014

(87) PCT Pub. No.: WO2013/019155
PCT Pub. Date: Feb. 7, 2013

(65) Prior Publication Data
US 2014/0192701 A1    Jul. 10, 2014

Related U.S. Application Data

(60) Provisional application No. 61/513,024, filed on Jul. 29, 2011.

(51) Int. Cl.
*H04W 24/10* (2009.01)
*H04W 4/06* (2009.01)
*H04W 76/00* (2009.01)
*H04L 29/08* (2006.01)
*H04W 72/00* (2009.01)
*H04L 12/18* (2006.01)

(52) U.S. Cl.
CPC ........... *H04W 24/10* (2013.01); *H04L 12/1868* (2013.01); *H04L 67/22* (2013.01); *H04W 4/06* (2013.01); *H04W 76/002* (2013.01); *H04L 12/189* (2013.01); *H04W 72/005* (2013.01)

(58) Field of Classification Search
None
See application file for complete search history.

(56) References Cited

U.S. PATENT DOCUMENTS

2008/0274759 A1* 11/2008 Chen et al. .................... 455/507
2010/0189027 A1*  7/2010 Ishida et al. .................. 370/312

(Continued)

OTHER PUBLICATIONS

ETSI TS 136 443: LTE; E-UTRAN; M2 Application Protocol M2AP; 3GPP TS 36.443, version 10.1.0 Release 10; Apr. 2011).*

(Continued)

*Primary Examiner* — Kodzovi Acolatse
(74) *Attorney, Agent, or Firm* — Coats & Bennett, PLLC

(57) ABSTRACT

Methods (400, 500) and apparatus (16, 24) are disclosed for reporting and processing MBMS counting results. According to one exemplary embodiment, a base station counting request received from a MCE includes an update time, and identifiers for one or more MBMS services (402, 502). The base station includes the update time with its reported counting results (410). The MCE uses the update time to identify the transmitted counting request (506), and ignores counting data for services not identified in the request (516). In the same or another embodiment, if the base station has not received MBMS counting results from its supported UEs for one or more of the identified services within a defined reporting window (406), the base station transmits an empty list of service identifiers to the MCE (408). The MCE correspondingly determines that the base station has not yet received MBMS counting results for one or more of the identified services based on receiving the empty list (508, 510).

12 Claims, 8 Drawing Sheets

(56) References Cited

U.S. PATENT DOCUMENTS

| | | | |
|---|---|---|---|
| 2011/0021224 A1* | 1/2011 | Koskinen et al. | 455/507 |
| 2012/0202493 A1* | 8/2012 | Wang et al. | 455/435.1 |
| 2012/0263089 A1* | 10/2012 | Gupta et al. | 370/312 |

OTHER PUBLICATIONS

Ericsson, "Addition of MCCH Update Time IE to MBMS Service Counting Results Report", Change Request, 3GPP TSG-RAN WG3 Meeting #73, Aug. 22-26, Athens, Greece, Sep. 9, 2011, pp. 1-4, R3-112041, 3GPP.

Huawei, Response to R3-112040', 3GPP TSG-RAN WG3 Meeting #73, Aug. 22-26, 2011, Athens, Greece, Greece, Sep. 9, 2011, pp. 1-3, R3-112173, 3GPP.

ZTE, "One or more MBMS Service Counting Results Report procedure", 3GPP TSG-RAN WG3 #71, Feb. 21-25, 2011, Taipei, Feb. 15, 2011, pp. 1-5, R3-110719, 3GPP.

Nokia Siemens Networks, "Response documents to R3-112040 "Considerations on eMBMS Results report".", 3GPP TSG-RAN WG3 #73, Aug. 22-26, 2011, Athens, Greece, Sep. 9, 2011, pp. 1-6, R3-112175. 3GPP.

3rd Generation Partnership Project, 3rd Generation Partnership Project; Technical Specification Group Radio Access Network; Evolved Universal Terrestrial Radio Access (E-UTRA); Radio Resource Control (RRC) Protocol specification (Release 10); Technical Specification, 3GPP TS 36.331 v 10.2.0, Jun. 1, 2011, pp. 1-294, 3GPP, France.

Ericsson, "Considerations on eMBMS Results report", 3GPP TSG-RAN WG3 #73, Aug. 22-26, 2011, Athens, Greece, Sep. 9, 2011, pp. 1-6, R3-112040, 3GPP.

ZTE, "M2 MBMS Service Counting Request procedure", 3GPP TSG-RAN WG3 #73bis, Jan. 17-21, 2011, Dublin, Ireland, Jan. 10, 2011, pp. 1-4, R3-110144, 3GPP.

3rd Generation Partnership Project, "3rd Generation Partnership Project; Technical Specification Group Radio Access Network; Evolved Universal Terrestrial Radio Access Network (E-UTRAN); M2 Application Protocol (M2AP) (Release 10)", Technical Specification, 3GPP TS 36.443 V10.2.0, Jun. 1, 2011, pp. 1-84, 3GPP, France.

ZTE, "How to report more than 16 services", 3GPP TSG-RAN WG3 #71, Feb. 21-25, 2011, Taipei, Feb. 15, 2011, pp. 1-4, R3-110718, 3GPP.

* cited by examiner

IDENTIFICATION OF UE COUNTING RESULTS IN EMBMS

RELATED APPLICATIONS

This application claims priority to U.S. Provisional Patent Application No. 61/513,024, filed 29 Jul. 2011.

TECHNICAL FIELD

The present invention generally relates to multicast services, and more particularly relates to reporting and processing Multimedia Broadcast Multicast Service (MBMS) counting results.

BACKGROUND

The 3rd Generation Partnership Project (3GPP) has developed specifications for the delivery of Multimedia Broadcast Multicast Services (MBMS), which provides broadcast and multicast services over wireless networks. MBMS may be used for broadcasting of mobile television and radio services, as well as for file delivery, emergency alerts, and the like. Specifications are currently being developed for evolved MBMS (eMBMS), for deployment with networks based on 3GPP's specifications for Evolved Universal Terrestrial Radio Access (E-UTRA), also known as Long-Term Evolution (LTE).

Individual services provided by the MBMS system are known as MBMS Bearer Services. Each MBMS Bearer Service may be provided in a given service area using either multicast or broadcast modes. In MBMS the Multicast Control Channel (MCCH) is used for transmissions of control information required for reception of a Multicast Traffic Channel (MTCH). The MTCH is used for downlink transmission of MBMS services. There is one MCCH per MBSFN (Multicast-Broadcast Single Frequency Network).

The network uses a counting scheme to determine how many mobile devices (user equipment, or "UEs", in 3GPP parlance) in any given service area are currently using or are interested in using a particular MBMS Bearer Service. The results of this counting process are used to determine how to best allocate resources for the service, such as whether a service session should be stopped in a given area, or whether one or more dedicated (i.e., unicast) radio channels might yield a more efficient use of system resources than a broadcast or multicast transmission.

A general description of and high level requirements for MBMS is given in the specification "3rd Generation Partnership Project; Technical Specification Group Services and System Aspects; Multimedia Broadcast/Multicast Service (MBMS); Stage 1 (Release 10)," 3GPP TS 22.146, v 10.0.0, March 2011. A complementary specification, "3rd Generation Partnership Project; Technical Specification Group Services and System Aspects; Multimedia Broadcast/Multicast Service (MBMS) user services; Stage 1 (Release 10)," 3GPP TS 22.246, v 10.0.0, March 2011, describes MBMS user services and user service requirements. Finally, a more detailed description of the MBMS system architecture and functionality is given in "3rd Generation Partnership Project; Technical Specification Group Services and System Aspects; Multimedia Broadcast/Multicast Service (MBMS); Architecture and functional description (Release 10)," 3GPP TS 23.246, v 10.1.0, June 2011.

FIG. 1 illustrates the overall architecture of the "Evolved Universal Terrestrial Radio Access Network" (E-UTRAN) portion of an LTE network 10. The network 10 includes the E-UTRAN 12 and an Evolved Packet Core 14 (or "core network") portion of the network 10. The E-UTRAN 12 includes base stations (or "eNodeBs") 16 which support wireless communication with one or more user equipment (UEs) 18. More specifically, the eNodeBs 16 provide the E-UTRA user plane (PDCP/RLC/MAC/PHY) and control plane (RRC) protocol terminations towards UEs 18. The eNodeBs 16 are interconnected with each other via the X2 interface. The eNodeBs 18 are also connected to the EPC 14 via the S1 interface. More specifically, the eNodeBs 18 are connected the MME (Mobility Management Entity) by means of the S1-MME interface and to the Serving Gateway (S-GW) by means of the S1-U interface. The S1 interface supports a many-to-many relation between MMEs/Serving Gateways and eNodeBs. Although a single reference numeral 20 is used to identify the MME and S-GW in FIG. 1, it is understood that these are separate logical entities, and possibly separate network nodes, with the MME communicating with the eNodeBs 18 via the S1-MME interface, and the S-GW communicating with the eNodeBs 118 via the S1-U interface.

The 3GPP TS 36.300 standard describes the functions performed by the MME and S-GW in great detail. FIG. 2 illustrates some of this functionality. In particular, FIG. 2 illustrates the functional split between the E-UTRAN 12 and the EPC 14. As shown in FIG. 2, the eNodeBs 18 hosts the following functions:

Functions for Radio Resource Management Radio Bearer Control, Radio Admission Control, Connection Mobility Control, Dynamic allocation of resources to UEs in both uplink and downlink (scheduling);

Selection of an MME at UE attachment when no routing to an MME can be determined from the information provided by the UE;

Routing of User Plane data towards the Serving Gateway;

Scheduling and transmission of paging messages (originated from the MME);

Scheduling and transmission of broadcast information (originated from the MME or O&M);

Measurement and measurement reporting configuration for mobility and scheduling; and Scheduling and transmission of PWS (which includes ETWS and CMAS) messages (originated from the MME).

Additionally, as further shown in FIG. 2, the MME 22 hosts the following functions:

NAS signalling;

NAS signalling security;

AS Security control;

Inter CN node signalling for mobility between 3GPP access networks;

Idle mode UE Reachability (including control and execution of paging retransmission);

Tracking Area list management (for UE in idle and active mode);

PDN GW and Serving GW selection;

MME selection for handovers with MME change;

SGSN selection for handovers to 2G or 3G 3GPP access networks;

Roaming;

Authentication;

Bearer management functions including dedicated bearer establishment;

Support for PWS (which includes ETWS and CMAS) message transmission; and

Optionally performing paging optimisation.

FIG. 3 illustrates the logical architecture of eMBMS. The MBMS-specific components in FIG. 3 include the Multi-cell/ multicast Coordination Entity (MCE) 24 and the MBMS Gateway (MBMS GW) 26. The MCE 24 is a logical entity that may be a standalone network node, or may be part of another network node (e.g., an eNodeB 16 or MME 22). The MCE 24 handles admission control and the allocation of the radio resources used by all eNodeBs 16 in the MBSFN area for multi-cell MBMS transmissions using MBSFN operation. The MCE 24 decides not to establish the radio bearer(s) of the new MBMS service(s) if the radio resources are not sufficient for the corresponding MBMS service(s) or may pre-empt radio resources from other radio bearer(s) of ongoing MBMS service(s) according to ARP. Besides allocation of the time/frequency radio resources, this also includes deciding the further details of the radio configuration, e.g., the modulation and coding scheme. The MCE 24 also performs the following functions:

Counting and acquisition of counting results for MBMS service(s);

Resumption of MBMS session(s) within MBSFN area(s) based on e.g. the ARP and/or the counting results for the corresponding MBMS service(s); and Suspension of MBMS session(s) within MBSFN area(s) based e.g. the ARP and/or on the counting results for the corresponding MBMS service(s).

The MCE 24 is involved in MBMS Session Control Signalling, but does not perform UE-MCE signalling. When the MCE 24 is part of another network element, an eNodeB 16 is served by a single MCE 24.

The MBMS GW 26 is also a logical entity. The MBMS GW 26 may be a standalone network node, or may be part of another network node. The MBMS GW 26 26 is present between the Broadcast Multicast Service Center (BMSC) and eNodeBs 12 whose principal functions is the sending/broadcasting of MBMS packets to each eNodeB 16 transmitting the service. The MBMS GW 26 uses IP Multicast as the means of forwarding MBMS user data to the eNodeB. The MBMS GW 26 performs MBMS Session Control Signalling (e.g., session start/stop) towards the E-UTRAN via the MME 22.

FIG. 3 illustrates the M1, M2 and M3 interfaces. While the M1 is a user plane interface between the eNodeB 16 and MBMS GW 26, the M2 and M3 interfaces are control plane interfaces. The MCE 24 and MME 22 communicate via the M3 control plane interface. As described in 3GPP TS 36.300, "An Application Part is defined for this interface between MME and MCE. This application part allows for MBMS Session Control Signalling on E-RAB level (i.e. does not convey radio configuration data). The procedures comprise e.g. MBMS Session Start and Stop. SCTP is used as signalling transport i.e. Point-to-Point signalling is applied."

The eNodeB 16 and MCE 24 communicate via the M2 interface. As described in 3GPP TS 36.300, "An Application Part is defined for this interface, which conveys at least radio configuration data for the multi-cell transmission mode eNodeBs and Session Control Signalling. SCTP is used as signalling transport i.e. Point-to-Point signalling is applied."

In eMBMS, a counting procedure is used to determine the quantity of UEs 18 that are interested in receiving a service. Among other things, this allows the system operator to decide whether the service should be delivered using MBMS Single-Frequency Network (MBSFN), which involves the transmission of a stream from multiple, time-synchronized eNodeBs 16 serving a particular area.

The counting procedure is initiated by the network 10, with a request sent to each eNodeB 16 involved in a particular MBSFN area to perform a count. This request, called a "MBMS Service Counting Request," is sent by the MCE 24 to each eNodeB 16. This triggers the eNodeBs 16 to send a Counting Request to their supported UEs 18, via the Multicast Control Channel (MCCH). The UEs 18, in turn, respond to their supporting eNodeB 16 with Radio Resource Control (RRC) Counting Response messages, which identify the MBMS services of interest to the UEs 18.

The MBMS Service Counting Request (or "base station counting request") is sent by the MCE 24 to the eNodeB 16, to request that the eNodeB 16 report the number of connected mode UEs 18 that are receiving or are interested in receiving one or more identified MBMS services. The MBMS Service Counting Request is currently defined by 3GPP TS 36.443, v 10.2.0 (June 2011). As described by this specification, the MBMS Service Counting Request includes the following:

Message Type;
MCCH Update Time;
MBSFN Area ID; and
One or more TMGI identifiers (i.e., TMGIs).

The MCCH (Multicast Control Channel) Update Time indicates a time at which the request should be made effective on the MCCH transmitted from the eNodeBs. A "TMGI" is a Temporary Mobile Group Identity. TMGIs are used to identify individual MBMS Service Bearers (i.e., individual MBMS services).

In response to the base station counting request, the eNodeB 16 sends back an MBMS Counting Results Report. This report is sent by the eNodeB 16 to the MCE 24, to report the number of connected mode UEs 18 that are receiving or are interested in receiving the one or more MBMS services indicated in the MBMS Service Counting Request message. The MBMS Counting Results Report is defined in 3GPP TS 36.443, v 10.2.0 as including the following:

Message Type;
MBSFN Area ID; and
MBMS Counting Result List (including, for each requested service, the TMGI identifying the service and a counting result).

However under the reporting configuration in the 3GPP specifications discussed above, there are a number of issues with the MBMS Counting Results Report, as there are certain scenarios under which it is unclear at the MCE how to process the counting results.

SUMMARY

Methods and apparatus are disclosed for reporting and processing MBMS counting results. According to one exemplary embodiment, a method of reporting Multimedia Broadcast Multicast Service (MBMS) counting results is performed by a base station configured for MBMS. The base station receives a base station counting request from a Multi-cell/Multicast Coordination Entity (MCE) that includes an identifier for each of one or more MBMS services, and also includes an update time. The base station transmits corresponding UE counting requests to its supported UEs, to determine if the UEs are either receiving or want to receive the one or more MBMS services. If no counting results are received from the supported UEs within a defined reporting window for the one or more identified MBMS services, the base station transmits an empty list of service identifiers to the MCE. Otherwise, if counting results are received from the supported UEs for the one or more identified MBMS services within the defined reporting window, the base station transmits a report to the MCE that includes a determined quantity of UEs for each of the one or more identified services, and also includes the update time from the received request.

A corresponding base station operative to support MBMS is also disclosed. The base station includes a transceiver and one or more processing circuits configured to: receive a base station counting request from a MCE including an identifier for each of one or more MBMS services and also including an update time; and transmit corresponding UE counting requests to UEs supported by the base station, to determine if the UEs are either receiving or want to receive the one or more MBMS services. If no counting results are received from the supported UEs within a defined reporting window for the one or more identified MBMS services, the transceiver and one or more processing circuits are configured to transmit an empty list of service identifiers to the MCE. Otherwise, if counting results are received from the supported UEs for the one or more identified MBMS services within the defined reporting window, the transceiver and one or more processing circuits are configured to transmit a report to the MCE that includes a determined quantity of UEs for each of the one or more identified services, and also includes the update time from the received request.

According to one exemplary embodiment, a method of processing MBMS counting results for individual MBMS services is disclosed, with the method being implemented by a MCE. The MCE transmits a base station counting request to a base station in a MBMS service area, the request including an update time and one or more MBMS service identifiers. The base station counting request requests, for each of the identified MBMS services, a quantity of UEs that are either receiving or want to receive the identified MBMS service. The MCE receives a counting report from the base station, with the report including the update time, and determines that the counting report corresponds to the base station counting request based on the update time in the counting report matching the update time in the base station counting request. The MCE ignores any counting data in the report that corresponds to services not identified in the transmitted request. If the report includes an empty list of service identifiers, the MCE determines that the base station did not receive counting results within a defined reporting window from its UEs for the one or more identified MBMS services.

A corresponding MCE operative to support MBMS is also disclosed. The MCE includes a transceiver and one or more processing circuits configured to: transmit a base station counting request to a base station in a MBMS service area, the request including an update time and one or more MBMS service identifiers. The base station counting request requests, for each of the identified MBMS services, a quantity of UEs that are either receiving or want to receive the identified MBMS service. The transceiver and one or more processing circuits are further configured to: receive a counting report from the base station, with the report including the update time, and determine that the counting report corresponds to the base station counting request based on the update time in the counting report matching the update time in the base station counting request. Any counting data included in the report that corresponds to services not identified in the transmitted request is ignored. If the report includes an empty list of service identifiers, it is determined that the base station did not receive counting results from its UEs for the one or more identified MBMS services within a defined reporting window.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
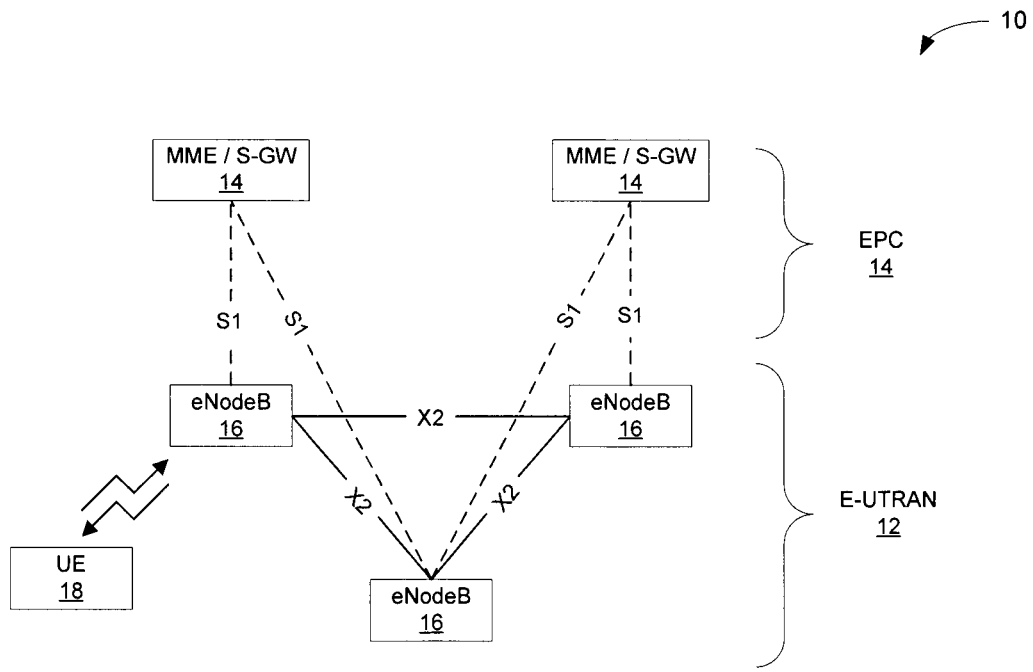
FIG. 1 illustrates portions of an exemplary LTE network.
Figure 3:
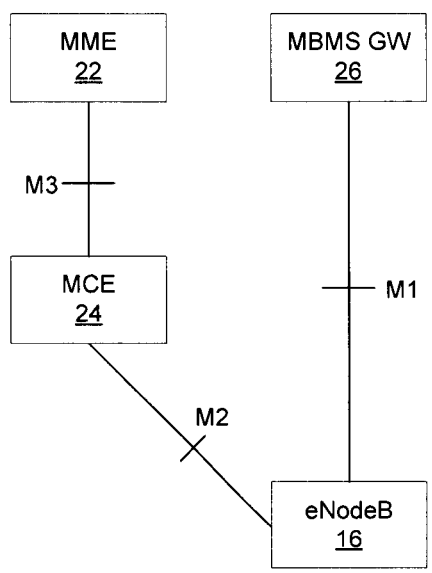
FIG. 3 illustrates the M1, M2 and M3 interfaces.
Figure 2:
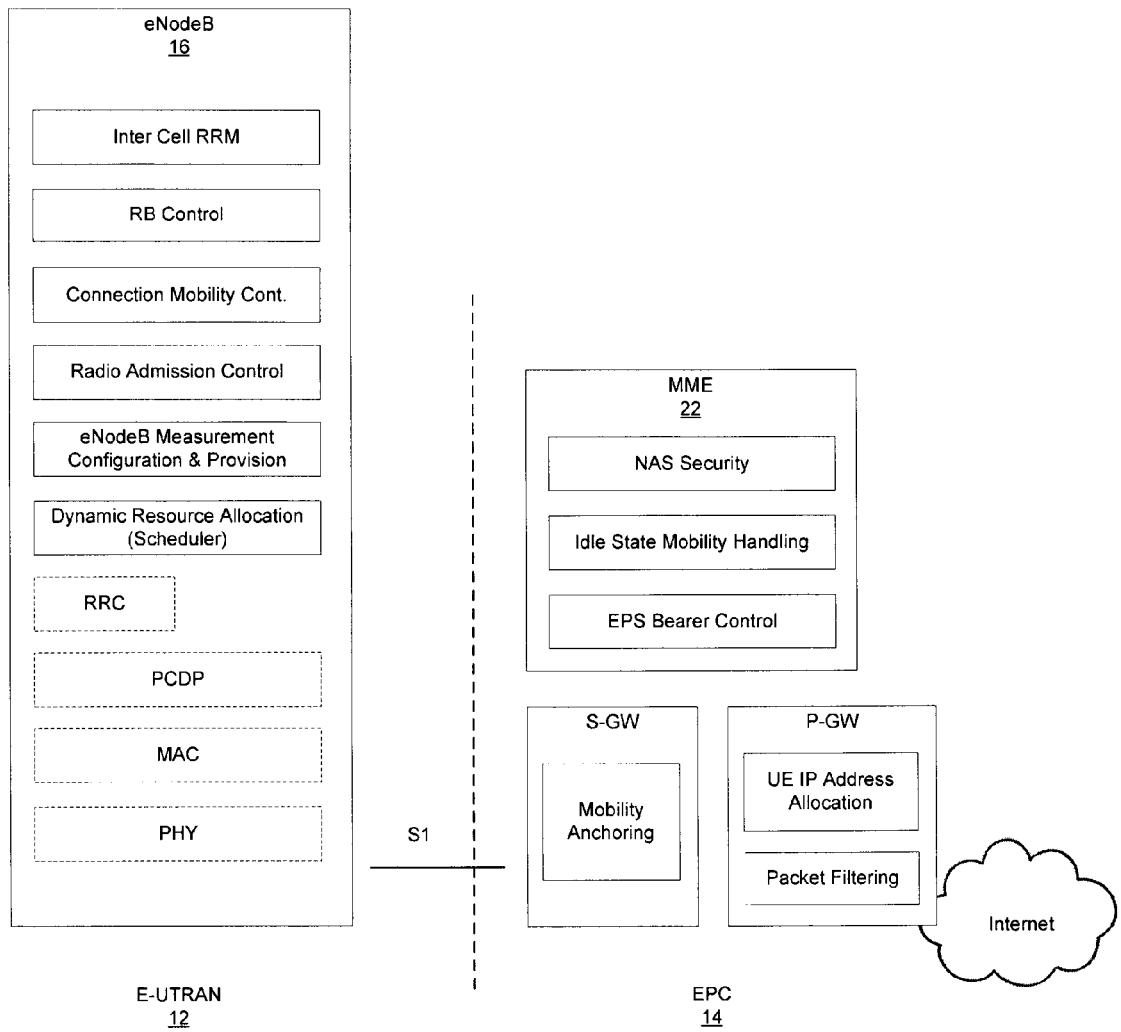
FIG. 2 illustrates a functional split between the radio access network (E-UTRAN) and core network portion of an LTE network.

Methods and apparatus are disclosed to address issues with prior art MBMS Counting Results Report processing. A first such issue relates to the receipt, at the MCE 24, of extraneous reporting results. If the MBMS Service Counting Results Report message for a given MBSFN area contains one or more TMGIs corresponding to the configuration of one MBMS Service Counting Request message, and some other TMGIs not part of this configuration, the 3GPP TS 36.443 v 10.2.0 standard suggests that the MCE 24 should ignore the result corresponding to those other TMGIs. However, in some cases it is unclear in the standard how a MCE 24 should detect which TMGIs to accept and which to reject.

This is highlighted below in the example of Table 1, which includes a sequence of MBMS Service Counting Request messages sent by the MCE 24. Each row of the table represents a MBMS Service Counting Request (i.e., a "base station counting request"). The left column shows the MCCH Update time when the MCE 24 triggers the message, and the remaining three columns show the information provided in the message.

TABLE 1

Sequence of MBMS Service Request messages triggered by the MCE

| (MCCH Update Time when MCE triggers MBMS Service Counting Request) | Counting Request | | |
|---|---|---|---|
| | MBSFN Area ID | MCCH Update Time | TMGI |
| 1 | 1 | 3 | 1 |
| 2 | 1 | 4 | 2 |
| 3 | 1 | 5 | 1, 2 |

Assume that at MCCH Update Time=6, the MCE 24 receives a MBMS Service Counting Results Response message containing the following data:
MBSFN Area ID=1
TMGI=1; Counting Result=3
TMGI=2; Counting Result=3
Based on this report, the MCE needs to decide if the results for TMGI=2 shall be ignored or not. Two example interpretations are: (1) the MCE 24 shall ignore the Counting Result for TMGI=2, because counting for TMGI=1 was requested and has not been received; or (2) the MCE shall accept the Counting Result for TMGI=1 and TMGI=2, because counting for both TMGIs has been requested. However, it is unclear which option to select, because it is unclear which particular MBMS Service Counting Request the received results correspond to.

This issue can be addressed by adding the MCCH Update Time information element (IE) in the MBMS Service Counting Result Report. When the MCE 24 receives its transmitted MCCH Update Time, it can determine which MBMS Service Counting Request the received results correspond to, and it then becomes clear which results, if any, need to be ignored. Under this arrangement, at MCCH Update Time=6, the MCE 24 may receive a MBMS Service Counting Results Response message including the following data:

MBSFN Area ID=1
MCCH Update Time=5
TMGI=1; Counting Result=3
TMGI=2; Counting Result=3

Referring back to Table 1, for MCCH Update Time=5 the MCE requested counting results for TMGI 1 and 2. Therefore, upon receiving the MCCH Update Time in the counting results, the MCE knows to accept the counting results for both TMGI=1 and TMGI=2.

Table 2 shows all the possible cases for the scenario above when various MCCH Update Times are introduced in the response messages. The values for the counting results are not relevant for the discussion, and are therefore not included in the table. In Table 2, the three columns to the left show the information received in the MBMS Service Counting Results Report message when the MCCH Update Time is added. The column on the right shows the result when the MCE 24 evaluates an abnormal condition.

TABLE 2

MCE evaluation of counting results

| MBSFN Area ID | MCCH Update Time | Received TMGI | Result MCE test abnormal condition |
|---|---|---|---|
| 1 | 3 | 1, 2 | ignore TMGI = 2 |
| 1 | 4 | 1, 2 | ignore TMGI = 1 |
| 1 | 5 | 1, 2 | accept TMGI = 1 & 2 |

Thus, this first issue of ambiguity in processing potentially extraneous received counting results can be resolved by including the MCCH Update Time received in the base station counting request in the reported results.

Another issue with prior art MBMS Counting Results Report processing is the handling of partial or total report failure. For example, consider that the MCE 24 has requested counting for a set of services, and the eNodeB 16 has responded with the MBMS Service Counting Response message (acknowledging receipt of the base station counting request). Subsequently, the eNodeB 16 becomes aware that it is not able to provide counting results for a subset or the complete set of TMGIs requested by the MCE 24 within a defined reporting window (e.g., because counting results have not been received from supported UEs 18 for some or all of the identified services). As discussed below, this may result in the MCE 24 not receiving counting results, and correspondingly initiating a multicast service for which there is little or no demand. This problem is highlighted in FIGS. 4-6. In the discussion below, T refers to a minimum time to MBMS Data Transfer (see 3GPP TS 36.444, which defines the M3 Application Protocol), and $T_{wait}$ refers to a time until the MCE 24 expects to receive a successful counting result (i.e., a "reporting window").

Figure 4:
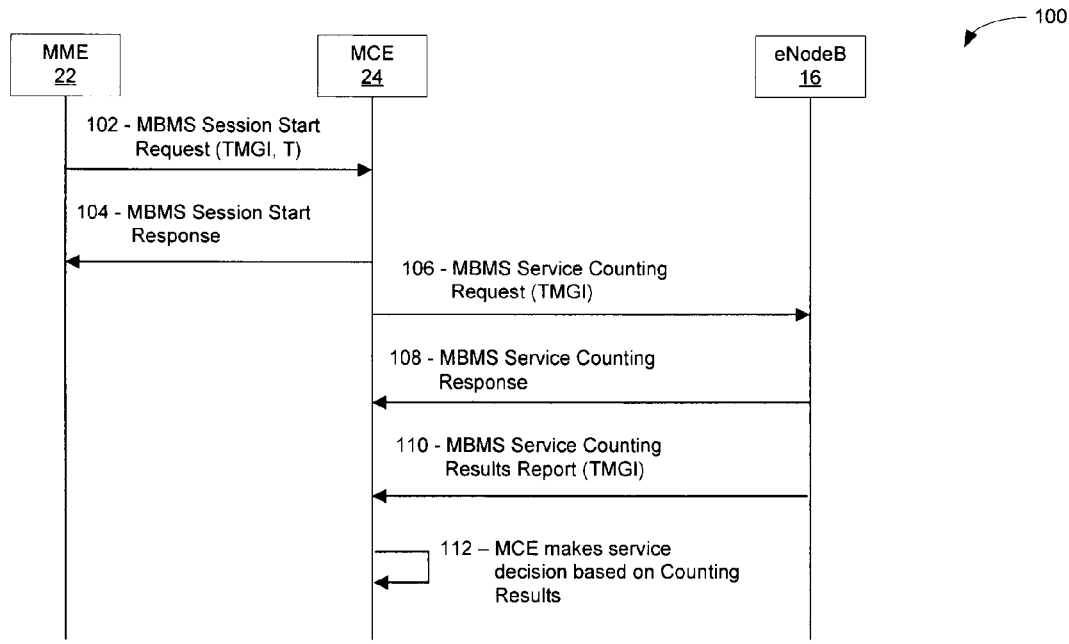
FIG. 4 is a call flow diagram illustrating a successful MBMS counting scenario.

FIG. 4 is a call flow diagram 100 illustrating a successful MBMS counting scenario. Referring to FIG. 4, the MCE 24 receives a "MBMS Session Start Request" from the MME 22, including one or more TMGIs which act as service identifiers, and a Minimum Time to MBMS Data Transfer time T from the MME 22 (step 302). The MCE 24 responds successfully to the MME 22 with a "MBMS Session Start Response" (step 104). The MCE 24 notices that $T>T_{wait}$ and sends the MBMS Service Counting Request to the eNodeB 16 (step 106). The eNodeB 16 confirms the counting request (step 108), and sends a "MBMS Service Counting Results Report" containing the result for the requested TMGI(s) (step 110), which is received by the MCE 24 the time $T_{wait}$ after step 106. The MCE 24 then uses the counting results data to make a service decision (step 112) (e.g., deciding not to start the session if an insufficient quantity of UEs 18 want the service in question). Thus, in this example, requested counting results are successfully received.

Figure 5:
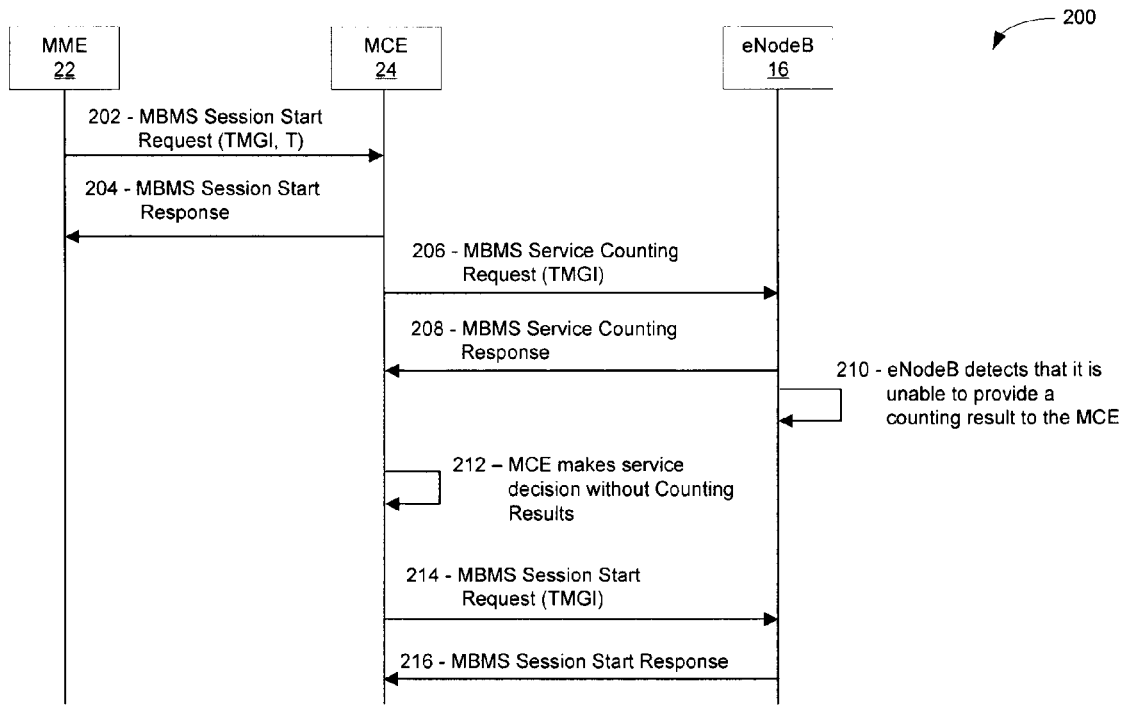
FIG. 5 is a call flow diagram illustrating a failed MBMS counting scenario.

FIG. 5 is a call flow diagram 200 of an unsuccessful counting scenario, in which the MCE 24 does not receive the MBMS Service Counting Request from the eNodeB 16 and therefore does not have sufficient information to make a service session decision. Referring to FIG. 5, the MCE 24 receives a MBMS Session Start Request message containing a TMGI and Minimum Time to MBMS Data Transfer from the MME 22 (step 202), and the MCE 24 responds successfully with MBMS Session Start Response to the MME 22 (step 204). The MCE 24 notices that $T>T_{wait}$ and sends the MBMS Service Counting Request to the eNodeB 16 (step 206), and the eNodeB 16 confirms the counting request (step 208). The eNodeB 16 detects that it is not able to provide a counting result to the MCE 24 (step 210). Step 210 may correspond to the eNodeB 16 determining that it has not received any counting data for the service identified in step 202 within a defined reporting window (e.g., $T_{wait}$). In view of this, the eNodeB 16 does not send a "MBMS Service Counting Results Report" (because it must have counting data for at least one TMGI to send such a response). Subsequently, lacking sufficient counting information from the eNodeB 16 to determine whether the service in question should be started, the MCE makes a service decision without the counting results (step 212). Based on this decision, the MCE 24 may decide to start the service without the results (step 214), and the eNodeB 16 responds with the MBMS Session Start response (step 216).

To address this issue, the eNodeB 16 may be configured to transmit an empty list of service identifiers if no counting results are received from its supported UEs 18 for one or more of the MBMS services identified in the initial request (e.g., step 102, 202). This allows the eNodeB to provide information to the MCE 24 when there are no counting results to report, by allowing an empty list of MBMS Counting Results to be reported.

Figure 6:
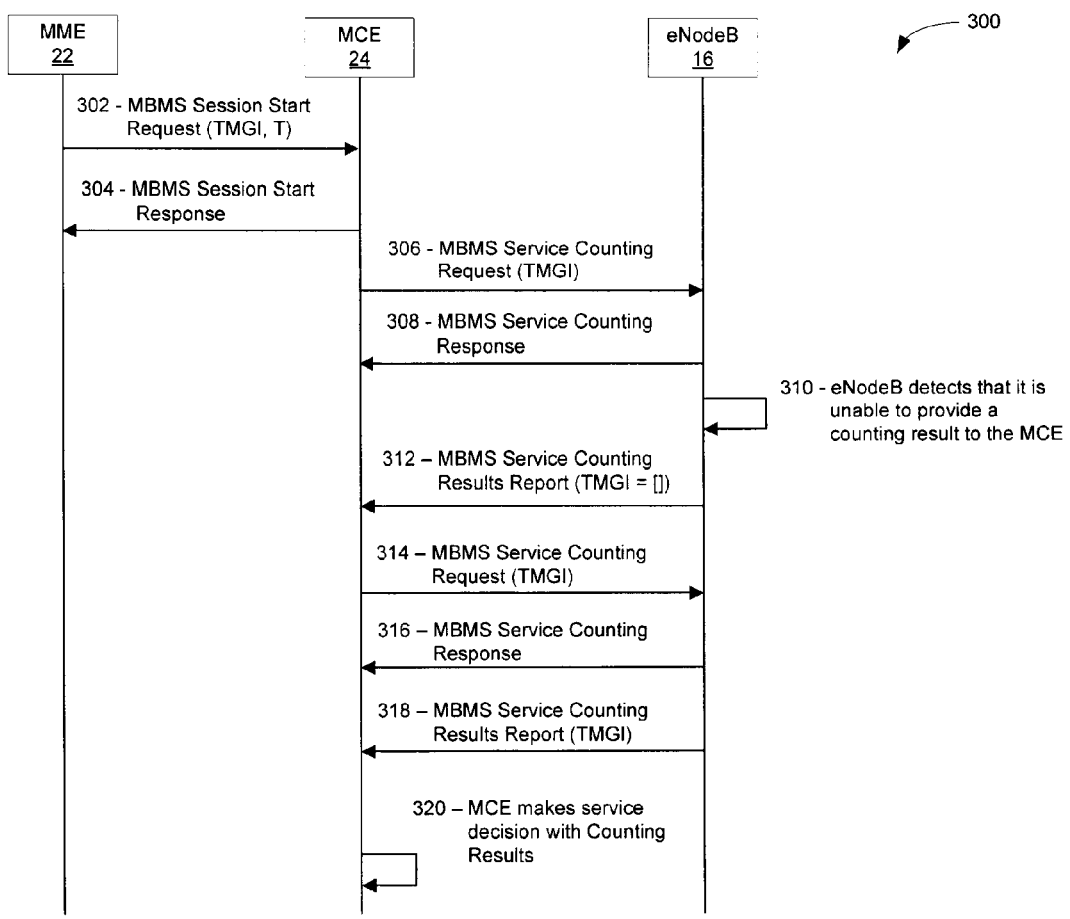
FIG. 6 a call flow diagram illustrating a novel method for handling a scenario where MBMS counting results are not received.

FIG. 6 illustrates a call flow diagram 300 for this novel scenario. Referring to FIG. 6, the MCE 24 receives the MBMS Session Start Request message containing the TMGI and Minimum Time to MBMS Data Transfer from the MME 22 (step 302), and the MCE 24 responds successfully with MBMS Session Start Response to the MME 22 (step 304). The MCE 24 notices that $T>T_{wait}$ sends the MBMS Service Counting Request to the eNodeB 16 (step 306). The eNodeB 16 confirms the counting request (step 308), detects that it is not able to provide a counting result to the MCE 24 (step 310), and then sends the MBMS Service Counting Response message with an empty list of TMGIs to the MCE 24 (step 312). The MCE 24 notices that T>$T_{wait}$ and sends another MBMS Service Counting Request to the eNodeB 16 (step 314). The eNodeB 16 confirms the counting request (step 316), determines that it now has counting data to report, and sends the MBMS Service Counting Results Report containing the result for the requested TMGI to the MCE 24, which is received by the MCE 24 within the $T_{wait}$ reporting window after step 314 (step 318). Based on the result received from the eNodeB 16 in step 520 the MCE 24 may decide to not start the session (step 320).

Figure 7:
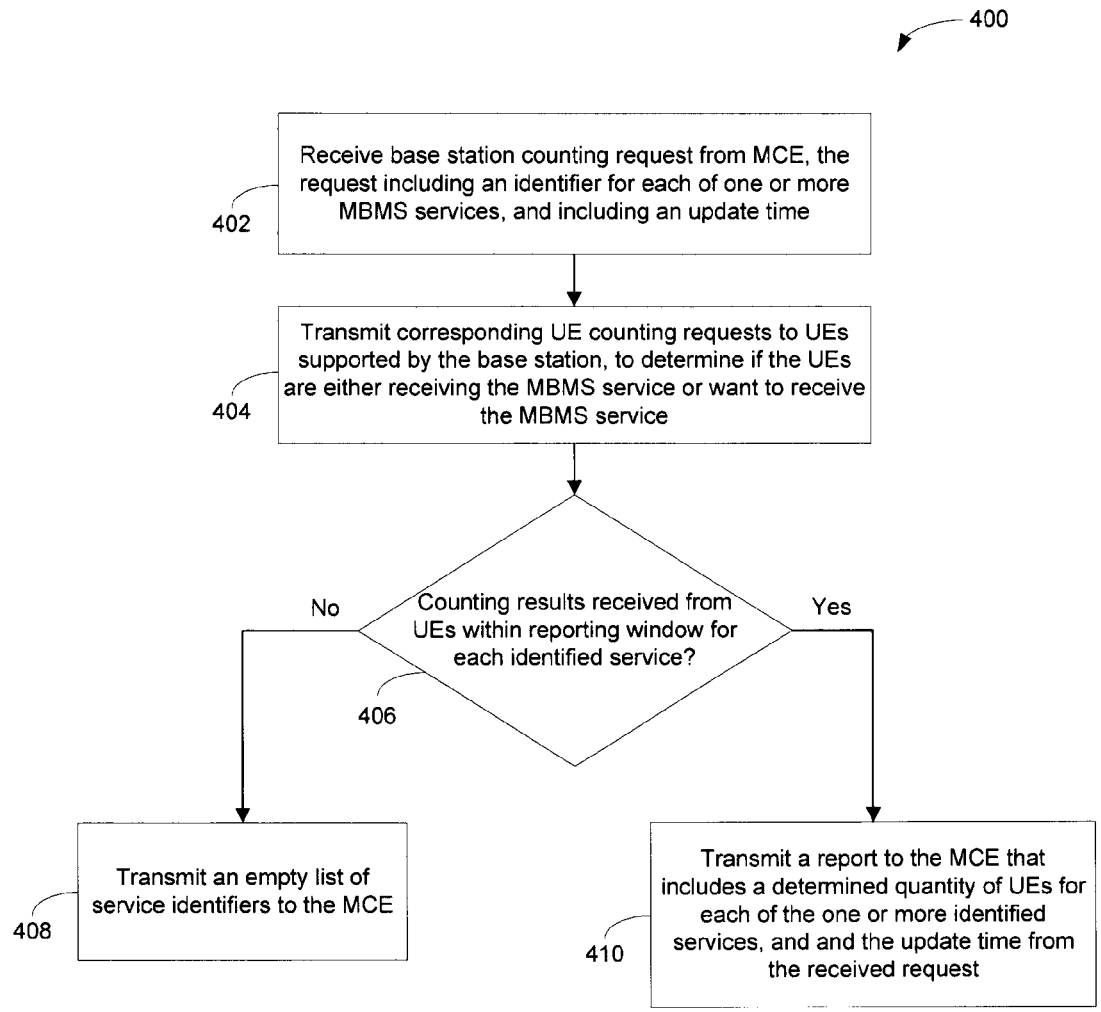
FIG. 7 illustrates an exemplary method of reporting MBMS counting results.

FIG. 7 illustrates a method 400 of reporting MBMS counting results. The method 400 is performed by a base station (e.g., an eNodeB 16), which is configured for MBMS. According to the method, the base station 16 receives a base station counting request from MCE 24, with the request including an identifier for each of one or more MBMS services, and also including an update time (step 402). The base station 16 transmits corresponding UE counting requests to UEs 18 supported by the base station, to determine if the UEs 18 are either receiving or want to receive the one or more MBMS services (step 404).

A check is performed to determine if counting results are received from the supported UEs within a defined reporting window for each identified service (step 406). If the counting results are not received, the base station 16 transmits an empty list of service identifiers to the MCE 24 (step 408). In one example embodiment, counting results not being received corresponds to no counting results being received for any of the one or more identified services. In one example embodiment, counting results not being received corresponds to no counting results being received for a single one of the one or more identified services. For the discussion below, we will assume that no counting results being received in step 406 means that no results are received for any of the one or more identified services.

As mentioned above, if no counting results are received for some of the one or more identified MBMS services within the defined reporting window, the base station 16 transmits an empty list of service identifiers to the MCE 24 (step 408). Otherwise, if counting results are received from the supported UEs 18 for the one or more identified MBMS services within the defined reporting window, the base station 16 transmits a report to the MCE 24 (step 410), with the report including a determined quantity of UEs for each of the one or more identified services, and also including the update time from the received request of step 402.

Figure 8:
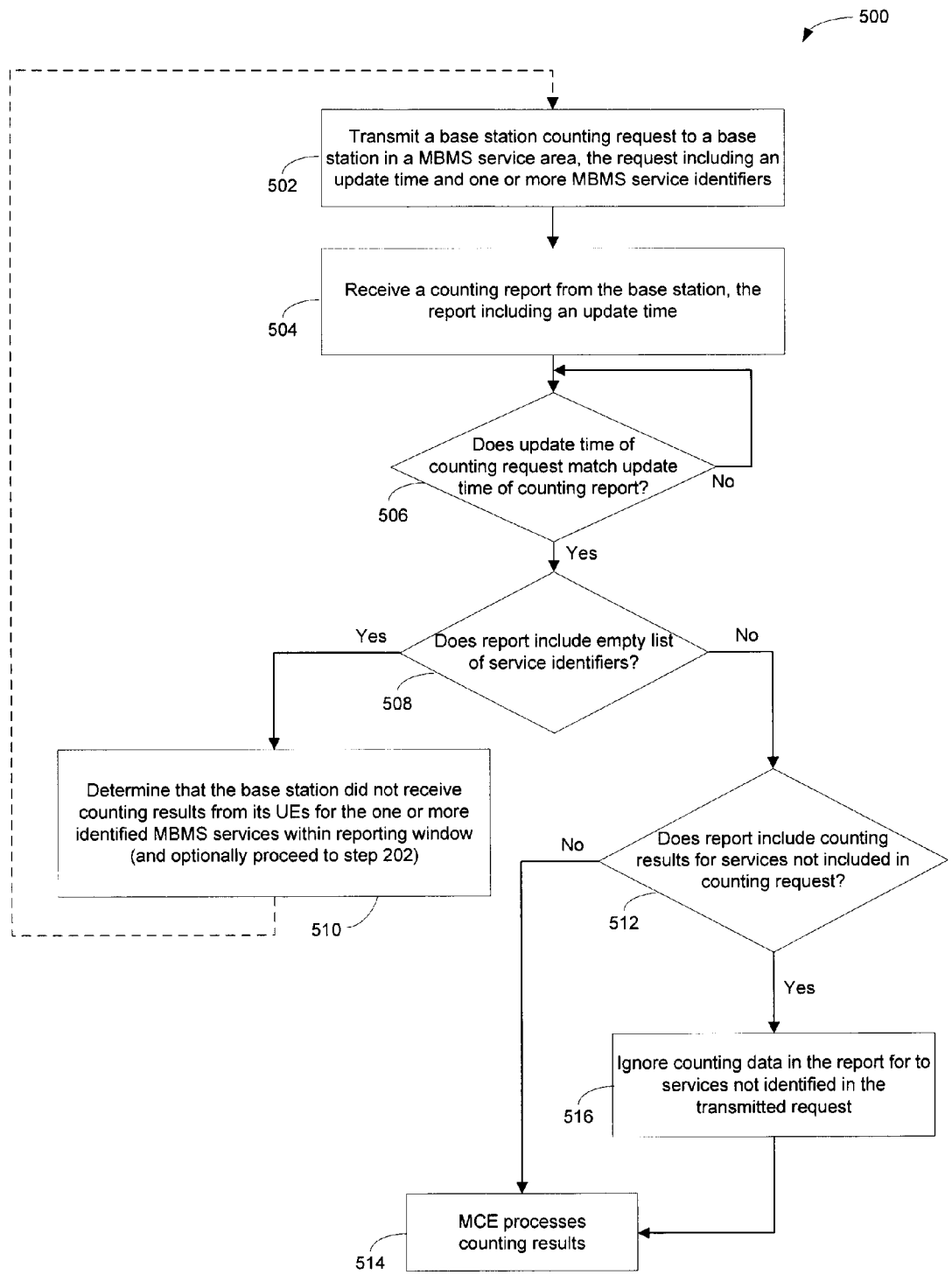
FIG. 8 illustrates an exemplary method of processing reported MBMS counting results.

FIG. 8 illustrates a method 500 performed by an MCE 24 to process MBMS counting results. The MCE 24 transmits a base station counting request to a base station (e.g., an eNodeB 16) in a MBMS service area (step 502). The request of step 502 including an update time and one or more MBMS service identifiers. The base station counting request of step 502 requests, for each of the identified MBMS services, a quantity of UEs 18 that are either receiving or want to receive the identified MBMS service. The MCE 24 receives a counting report from the base station 16 that includes an update time (step 504). A check is performed to determine if there is a match between the update time of the received report of step 504 and the transmitted counting request of step 502 (step 506). The update time may be the "MCCH Update Time," for example. If there is no match (indicating that the received results are not those requested in step 502), then the MCE 24 waits for the requested results.

Otherwise, if the update times match, then a check is performed to see if the received report includes an empty list of service identifiers (step 508). If an empty list of identifiers is received, the MCE 24 determines that the base station 16 did not receive counting results from its UEs 18 within the reporting window for one or more of the MBMS services identified in the counting request (step 510), and the MCE may optionally proceed again to step 502 to transmit another counting request of step 502.

However, if the report does not include an empty list of service identifiers, then a check is performed to see if the report includes counting results for services not included in the counting request (step 512). If no such extraneous results are received, then the MCE 24 processes the counting results (step 514). Otherwise, if such extraneous results are received then the MCE 24 ignores them (step 516) and they are omitted from MCE 24 processing (step 514). Thus, the MCE 24 ignores any counting data included in the report that corresponds to services not identified in the transmitted request.

To implement the methods 400, 500 the "MBMS Service Counting Results Report" is updated to include (1) an MCCH Update Time corresponding to an MCCH Update Time sent in an earlier MBMS Service Counting Request message, and (2) an empty list of service identifiers if the eNodeB 16 has not yet received counting results for some or all of the one or more services identified in the counting request. Thus, the MCCH Update Time information element that was previously sent to the eNodeB in the MBMS Service Counting Request message should be included in the MBMS Service Counting Results Report message returned to the MCE 24. Inclusion of the MCCH Update Time in reporting results allows the MCE 24 to accurately determine which TMGIs should be ignored, if any. Also, enabling the eNodeB 16 to provide information to the MCE 24 even when there is no counting result to report enables the MCE 24 to make better service decisions.

Although the embodiments discussed above have included both of these features (i.e., inclusion of MCCH Update Time in counting results, and transmission of empty list of service identifiers), it is understood that these only one of these features may be included in a given embodiment. For example, in one embodiment a base station (e.g., an eNodeB 16) may be configured to include the MCCH Update Time in its counting results, but not be configured to transmit the empty list of service identifiers if no counting results are received from its supported UEs. Similarly, in another embodiment a base station (e.g., an eNodeB 16 may be configured to transmit an empty list of service identifiers if no counting results are received from its supported UEs, but may not be configured to transmit the MCCH Update Time in counting result reports when there are results to report. Correspondingly, in some exemplary embodiments an MCE 24 may be similarly configured to only implement one of the features discussed above (i.e., ignoring non-requested counting results based on an MCCH Update Time included in the report, and determining that a base station has not yet received counting results for one or more services if an empty list of service identifiers is received). Those skilled in the art will appreciate that specific embodiments of the techniques above include systems comprising one or more MMEs 22 and/or one or more eNodeBs 16, where these systems are configured to carry out the methods 400, 500 (or individual parts of them, as discussed above).

Figure 9A:
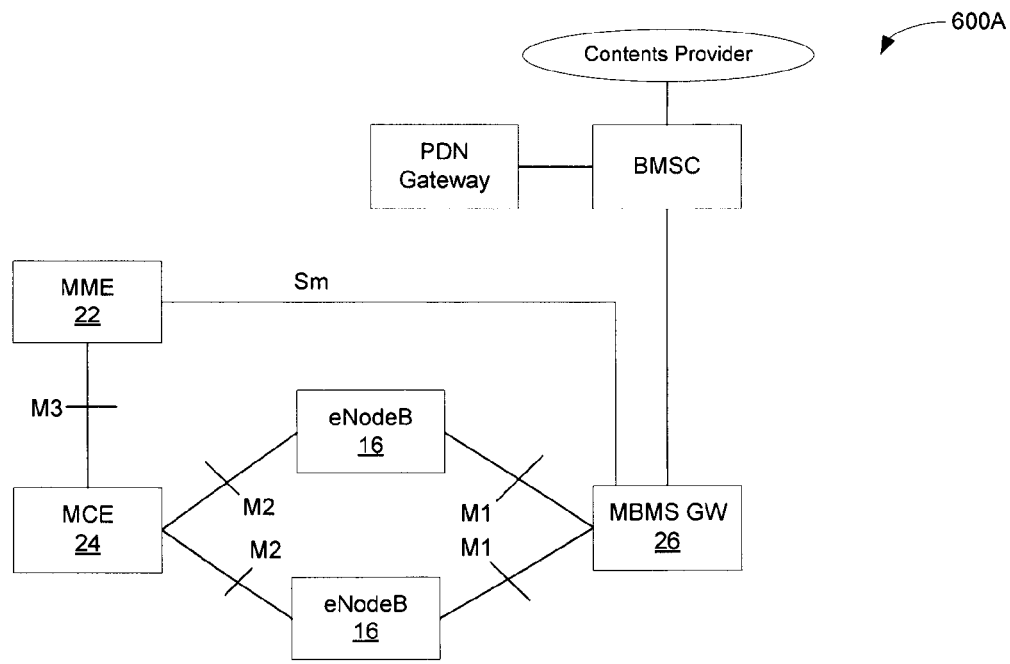
FIGS. 9A and 9B illustrate exemplary MCE configurations.
Figure 9B:
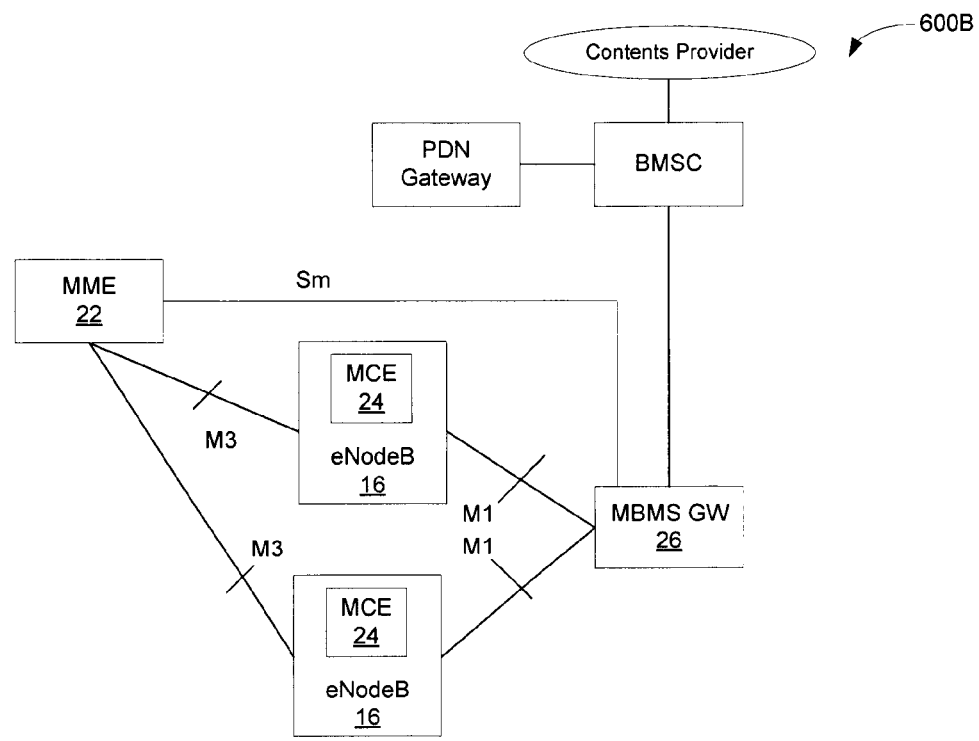

As noted above, the MCE 24 is a logical entity, and may be implemented in several physical configurations. For example, the MCE may be located in a standalone node (see network 600A of FIG. 9A), may be implemented in the same node as an eNodeB 16 (see network 600B of FIG. 9B), or may be implemented in the same node as an MME 22. However, under any of these configurations the MCE 24 and eNodeB 16 still communicate over the same M2 interface.

Accordingly, some embodiments of the invention include a network node, such as an MME 22, an eNodeB 16, a standalone MCE 24 unit, or some other network node, configured to implement the MCE 24 functionality described above, including the techniques for sending and receiving MBMS Service Counting Requests and MBMS Service Counting Responses, and processing them as discussed above, including in particular the receiving of MBMS Service Counting Responses having an MCCH Update Time field that indicates which MBMS Service Counting Request the response corresponds to, and determining which, if any, identifiers for MBMS Bearer Services included in the response should be ignored, based on the MCCH Update Time field. Each of these embodiments includes conventional network interface circuits and the like, with processing/control circuits that are modified to carry out one or several of the techniques described above. More particularly, these embodiments include a network interface circuit configured to communicate with an eNodeB 16 (whether over an internal or external physical interface), using the M2AP and other network communication standards. These embodiments further include a baseband and control processing circuit (see "processing circuit(s)" 62 of FIG. 10) that may include one or more microprocessors or microcontrollers, as well as other digital hardware, which may include digital signal processors (DSPs), special-purpose digital logic, and the like. Either or both of the microprocessor(s) and the digital hardware may be configured to execute program code stored in memory. The program code stored in the memory circuit, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein, in several embodiments. Because the various details and engineering tradeoffs associated with the design of baseband processing circuitry for wireless network nodes are well known and are unnecessary to a full understanding of the invention, additional details are not shown here.

Figure 10:
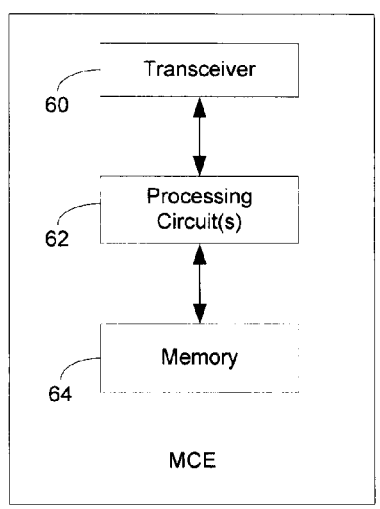
FIG. 10 illustrates an exemplary MCE.

FIG. 10, for example, illustrates a MCE 24 that includes a transceiver 60, one or more processing circuits 62, and memory 64. The memory 64 stores program code that configures the MCE 24 to implement the method 500. More specifically, the transceiver 60 and one or more processing circuits 62 are configured to transmit a base station counting request to a base station (e.g., eNodeB 16) in a MBMS service area, the request including an update time (e.g., MCCH Update Time) and one or more MBMS service identifiers, the base station counting request requesting, for each of the identified MBMS services, a quantity of UEs 18 that are either receiving or want to receive the identified MBMS service. The transceiver 60 and one or more processing circuits 62 are further configured to: receives a counting report from the base station 16, with the report including the update time, and determine that the counting report corresponds to the base station counting request based on the update time in the counting report matching the update time in the base station counting request. The transceiver 60 and one or more processing circuits 62 are further configured to perform at least one of: ignoring any counting data included in the report that corresponds to services not identified in the transmitted request; and determining that the base station 16 did not receive counting results within a defined reporting window from its UEs 18 for at least one of the one or more identified MBMS services if the report includes an empty list of service identifiers.

Other embodiments include an eNodeB 16 configured to carry out the techniques described herein, including the receiving of MBMS Counting Service Requests and the sending of responsive MBMS Counting Service Responses, and including in particular the including of an MCCH Update Time field in the responses, wherein the MCCH Update Time field corresponds to an MCCH Update Time received in an earlier request, and also including the sending of an MBMS Counting Service Response that includes an empty list of identifiers for MBMS Service Bearers in the event that the eNodeB was unable to complete the Counting Service. The eNodeB 16 functionality described herein can be implemented in hardware similar to that described above for the MCE 24 functionality. Accordingly, in various embodiments of the invention, processing circuits, such as the baseband and control processing circuits described earlier, are configured to carry out one or more of the techniques described above for eNodeB 16 support of MBMS Counting Services (see processing circuit 72 of FIG. 11). In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Figure 11:
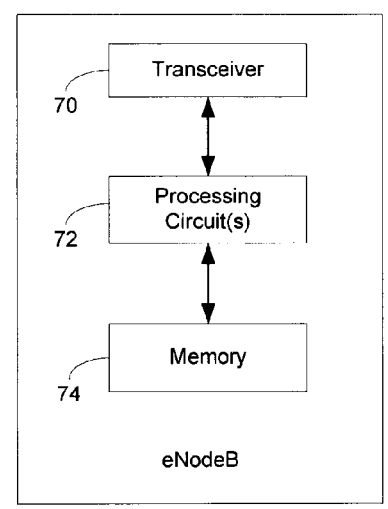
FIG. 11 illustrates an exemplary base station.

FIG. 11, for example, illustrates a base station (e.g., an eNodeB) 16 that includes a transceiver 70, one or more processing circuits 72, and memory 74. The memory 74 stores program code that configures the eNodeB 16 to implement the method 400. More specifically, the transceiver 70 and one or more processing circuits 72 are configured to receive a base station counting request from a Multi-cell/Multicast Coordination Entity (MCE) including an identifier for each of one or more MBMS services, and also including an update time; and are configured to transmit corresponding user equipment (UE) counting requests to UEs 18 supported by the base station 16, to determine if the UEs 18 are either receiving or want to receive the one or more MBMS services. The transceiver 70 and one or more processing circuits 72 are further configured to perform at least one of: transmitting an empty list of service identifiers to the MCE if no counting results are received within a defined reporting window for the one or more identified MBMS services; and transmitting to the MCE a report including a determined quantity of UEs for each of the one or more identified services, the report also including the update time from the received request, if counting results are received from the supported UEs for the one or more identified MBMS services within the defined reporting window.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

Additionally, while an LTE network has been used as an example environment for the embodiments discussed above, it is understood that this is only an example. Accordingly, while the inventive concepts described above are not necessarily limited in their applicability to 3GPP MBMS systems and procedures, the inventive techniques described herein can readily be understood and applied in the context of the system nodes and functionalities described in the 3GPP specifications discussed above.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

The invention claimed is:

1. A method performed by a base station of reporting Multimedia Broadcast Multicast Service (MBMS) counting results, comprising:
 receiving, by the base station, from a Multi-cell/Multicast Coordination Entity (MCE), a base station counting request, the base station counting request including an update time and an identifier for each of one or more MBMS services;
 transmitting, by the base station, to UEs supported by the base station, corresponding user equipment (UE) counting requests to determine whether each of the UEs is either receiving or wants to receive the one or more MBMS services;
 if no counting results are received from the supported UEs within a defined reporting window for the one or more identified MBMS services, transmitting, to the MCE, an empty list of service identifiers; and
 if counting results are received from the supported UEs for the one or more identified MBMS services within the defined reporting window, transmitting, to the MCE, a report, the report including:
  a determined quantity of UEs for each of the one or more identified services; and
  the update time from the received request.

2. The method of claim 1, wherein the update time is a Multicast Control Channel (MCCH) Update Time.

3. The method of claim 1:
 wherein the one or more identified MBMS services includes a plurality of MBMS services; and
 wherein if no counting results are received from the supported UEs within the defined reporting window for the one or more identified MBMS services and no counting results are received within a defined reporting window for a single one of the plurality of MBMS services, transmitting the empty list of service identifiers to the MCE.

4. A base station operative to support Multimedia Broadcast Multicast Services (MBMS), the base station comprising:
 a transceiver and one or more processing circuits that are jointly configured to:
  receive, from a Multi-cell/Multicast Coordination Entity (MCE), a base station counting request, the base station counting request including an update time and an identifier for each of one or more MBMS services;
  transmit, to UEs supported by the base station, corresponding user equipment (UE) counting requests to determine whether each of the UEs is either receiving or wants to receive the one or more MBMS services;
  if no counting results are received within a defined reporting window for the one or more identified MBMS services, transmit, to the MCE, an empty list of service identifiers; and
  if counting results are received from the supported UEs for the one or more identified MBMS services within the defined reporting window, transmit, to the MCE, a report, the report including:
   a determined quantity of UEs for each of the one or more identified services; and
   the update time from the received request.

5. The base station of claim 4, wherein the update time is a Multicast Control Channel (MCCH) Update Time.

6. The base station of claim 4:
 wherein the one or more identified MBMS services includes a plurality of MBMS services; and
 wherein the transceiver and the one or more processing circuits are further configured to:
  if no counting results are received within the defined reporting window for the one or more identified MBMS services and no counting results are received within a defined reporting window for a single one of the plurality of MBMS services, transmit the empty list of service identifiers to the MCE.

7. A method performed by a Multi-cell/Multicast Coordination Entity (MCE) of processing Multimedia Broadcast Multicast Service (MBMS) counting results for individual MBMS services, the method comprising:
 transmitting, by the MCE, to a base station, a base station counting request in an MBMS service area, the base station counting request including an update time and one or more MBMS service identifiers, the base station counting request requesting, for each of the identified MBMS services, a quantity of user equipment (UEs) that are either receiving or want to receive the identified MBMS service;
 receiving, by the MCE, from the base station, a counting report, the counting report including the update time;
 determining that the counting report corresponds to the base station counting request based on the update time in the counting report matching the update time in the base station counting request;
 determining not to use any counting data included in the report that corresponds to services not identified in the transmitted request; and
 if the report includes an empty list of service identifiers, determining that the base station did not receive counting results within a defined reporting window from its UEs for at least one of the one or more identified MBMS services.

8. The method of claim 7, wherein the update time is a Multicast Control Channel (MCCH) Update Time.

9. The method of claim 7, further comprising transmitting to the base station, if the counting report includes an empty list of service identifiers, an additional counting request.

10. A Multi-cell/Multicast Coordination Entity (MCE) operative to support Multimedia Broadcast Multicast Services (MBMS), the MCE comprising:
 a transceiver and one or more processing circuits jointly configured to:
  transmit, to a base station in an MBMS service area, a base station counting request, the request including an update time and one or more MBMS service identifiers, the base station counting request requesting, for each of the identified MBMS services, a quantity of user equipment (UEs) that are either receiving or want to receive the identified MBMS service;
  receive, from the base station, a counting report, the counting report including the update time;
  determine that the counting report corresponds to the base station counting request based on the update time in the counting report matching the update time in the base station counting request;

determine not to use any counting data included in the report that corresponds to services not identified in the transmitted request; and if the report includes an empty list of service identifiers, determine that the base station did not receive counting results within a defined reporting window from its UEs for at least one of the one or more identified MBMS services.

11. The MCE of claim 10, wherein the update time is a Multicast Control Channel (MCCH) Update Time.

12. The MCE of claim 10, wherein the transceiver and one or more processing circuits are jointly configured to transmit, to the base station, if the counting report includes an empty list of service identifiers, an additional counting request.

* * * * *